(12) United States Patent
Tanaami et al.

(10) Patent No.: US 12,318,925 B2
(45) Date of Patent: Jun. 3, 2025

(54) ROBOT AND METHOD OF CONTROLLING THE SAME

(71) Applicants: SINTOKOGIO, LTD., Nagoya (JP); UNIVERSITY OF YAMANASHI, Kofu (JP)

(72) Inventors: Yoshikane Tanaami, Nagoya (JP); Miyuki Hayashi, Nagoya (JP); Yoshiyuki Noda, Kofu (JP)

(73) Assignees: SINTOKOGIO, LTD., Aichi (JP); UNIVERSITY OF YAMANASHI, Yamanashi (JP)

( * ) Notice: Subject to any disclaimer, the term of this patent is extended or adjusted under 35 U.S.C. 154(b) by 194 days.

(21) Appl. No.: 18/173,342

(22) Filed: Feb. 23, 2023

(65) Prior Publication Data
US 2023/0278195 A1 Sep. 7, 2023

(30) Foreign Application Priority Data
Mar. 4, 2022 (JP) .................................. 2022-033903

(51) Int. Cl.
| | |
|---|---|
| *B25J 9/00* | (2006.01) |
| *B25J 9/16* | (2006.01) |
| *B25J 13/02* | (2006.01) |
| *B25J 13/08* | (2006.01) |

(52) U.S. Cl.
CPC ........... *B25J 9/0081* (2013.01); *B25J 9/1633* (2013.01); *B25J 13/02* (2013.01); *B25J 13/082* (2013.01); *B25J 13/085* (2013.01); *B25J 13/088* (2013.01)

(58) Field of Classification Search
CPC ........ B25J 9/0081; B25J 9/1633; B25J 13/02; B25J 13/082; B25J 13/085; B25J 13/088; B25J 9/1687; B25J 9/161; B25J 9/1612; B25J 18/00; B25J 19/02; B25J 9/163; B25J 13/065; G05B 2219/39319;
(Continued)

(56) References Cited

U.S. PATENT DOCUMENTS

| | | |
|---|---|---|
| 5,592,275 A | 1/1997 | Echigo et al. |
| 2009/0090795 A1 | 4/2009 | Ray |
| 2009/0192523 A1 | 7/2009 | Larkin et al. |

(Continued)

FOREIGN PATENT DOCUMENTS

| | | |
|---|---|---|
| JP | 02-009553 A | 1/1990 |
| JP | H11-76911 A | 3/1999 |

(Continued)

OTHER PUBLICATIONS

U.S. Office Action for U.S. Appl. No. 17/509,116 issued on Oct. 2, 2023.
(Continued)

*Primary Examiner* — Harry Y Oh
(74) *Attorney, Agent, or Firm* — Harness, Dickey & Pierce, P.L.C.

(57) ABSTRACT

A robot includes a robot hand, a robot arm, a force sensor, and a control device. The control device performs admittance control to determine a position of the robot hand in accordance with a force detected by the force sensor, and provides, to the robot arm, an instruction to move the robot hand to the determined position. Further, the control device records, as teaching data, the instruction provided to the robot arm.

10 Claims, 3 Drawing Sheets

(58) Field of Classification Search
CPC ........ G05B 2219/40032; G05B 19/423; G05B 2219/39529
See application file for complete search history.

(56) References Cited

U.S. PATENT DOCUMENTS

| | | |
|---|---|---|
| 2011/0190932 A1 | 8/2011 | Tsusaka et al. |
| 2011/0208355 A1 | 8/2011 | Tsusaka |
| 2016/0184032 A1* | 6/2016 | Romo .................... B25J 13/085 901/46 |
| 2017/0080562 A1* | 3/2017 | Tsuzaki ................. B25J 13/085 |
| 2018/0029232 A1 | 2/2018 | Ouchi et al. |
| 2018/0243916 A1 | 8/2018 | Hashimoto et al. |
| 2018/0281012 A1 | 10/2018 | Telleria et al. |
| 2018/0319013 A1 | 11/2018 | Shimodaira |
| 2019/0217468 A1 | 7/2019 | Ogata |
| 2019/0232492 A1 | 8/2019 | Takeuchi |
| 2019/0248006 A1 | 8/2019 | Takahashi |
| 2019/0255712 A1 | 8/2019 | Takeuchi |
| 2019/0283250 A1* | 9/2019 | Iwai ....................... B25J 9/1633 |
| 2019/0358811 A1 | 11/2019 | Sato et al. |
| 2020/0147787 A1* | 5/2020 | Takahashi ............. B25J 13/085 |
| 2021/0339392 A1 | 11/2021 | Handa et al. |
| 2022/0305645 A1* | 9/2022 | Nikovski ............... B25J 9/1648 |
| 2023/0032334 A1 | 2/2023 | Hane |
| 2023/0278205 A1 | 9/2023 | Yamaoka et al. |

FOREIGN PATENT DOCUMENTS

| | | |
|---|---|---|
| JP | 2009-274191 A | 11/2009 |
| JP | 2019018340 A | 2/2019 |
| JP | 2019-081236 A | 5/2019 |
| JP | 2019-141937 A | 8/2019 |

OTHER PUBLICATIONS

U.S. Office Action for U.S. Appl. No. 17/509,116 issued on Mar. 4, 2024.
U.S. Office Action for U.S. Appl. No. 17/509,116 issued on Jul. 8, 2024.
U.S. Office Action for U.S. Appl. No. 17/509,116 issued on Nov. 27, 2024.
U.S. Office Action for U.S. Appl. No. 17/851,505 issued on Nov. 5, 2024.
Japanese Office Action for Japanese Application No. 2021-162931 issued on Jan. 14, 2025 and English machine translation thereof.

* cited by examiner

ROBOT AND METHOD OF CONTROLLING THE SAME

This Nonprovisional application claims priority under 35 U.S.C. § 119 on Patent Application No. 2022-033903 filed in Japan on Mar. 4, 2022, the entire contents of which are hereby incorporated by reference.

TECHNICAL FIELD

The present invention relates to a robot including a robot arm and a robot hand. The present invention also relates to a method of controlling such a robot.

BACKGROUND ART

Conventionally, direct teaching has been used as one of teaching methods of teaching motions to robots. The direct teaching is a method of teaching motions to robots by having an operator who performs the teaching directly move a robot hand or a robot arm thereof. One document that discloses the direct teaching is, for example, Patent Literature 1.

CITATION LIST

Patent Literature

Patent Literature 1

Japanese Patent Application Publication, Tokukai, No. 2019-018340

SUMMARY OF INVENTION

Technical Problem

A robot for work disclosed in Patent Literature 1 performs impedance control (motion input and force output-type control) of a robot arm in the direct teaching. Thus, the operator is required to apply a relatively greater force when directly moving a robot arm or a robot hand. Further, because of the influence of the inertia of rinks, it is difficult for the operator to move the robot arm satisfactory. This makes it difficult to directly teach precise motions to robots.

An aspect of the present invention has been made in view of such circumstances, and an object thereof is to provide a robot capable of being subjected to direct teaching of a more precise motion with a smaller force.

Solution to Problem

A robot in accordance with an aspect of the present invention is a robot including a robot arm, a robot hand attached to the robot arm, a force sensor configured to detect a force acting on the robot hand, and a control device. The control device is a device that performs admittance control (force input and motion output-type control) to determine a position of the robot hand in accordance with the force detected by the force sensor, provides, to the robot arm, an instruction to move the robot hand to the determined position, and records, as teaching data, the instruction provided to the robot arm.

Further, a method of controlling a robot in accordance with an aspect of the present invention is a method of controlling a robot including a robot arm, a robot hand attached to the robot arm, and a force sensor configured to detect a force acting on the robot hand, and the method includes a controlling step. The controlling step is a step of: performing admittance control (force input and motion output-type control) to determine a position of the robot hand in accordance with the force detected by the force sensor; providing, to the robot arm, an instruction to move the robot hand to the determined position; and recording, as teaching data, the instruction provided to the robot arm.

Advantageous Effects of Invention

According to an aspect of the present invention, it is possible to provide a robot capable of being subjected to direct teaching of a more precise motion with a smaller force.

DESCRIPTION OF EMBODIMENTS

Figure 1:
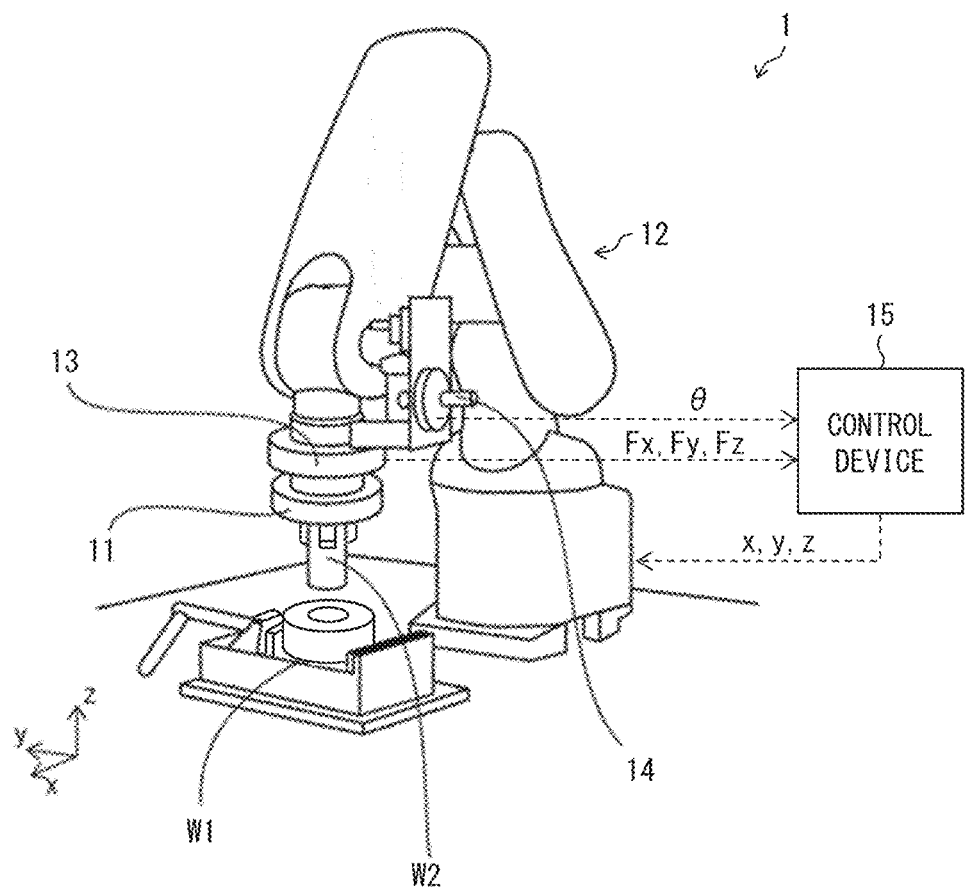
FIG. 1 is a schematic view illustrating a configuration of a robot in accordance with an embodiment of the present invention.

A robot 1 in accordance with an embodiment of the present invention will be described with reference to FIG. 1. FIG. 1 is a schematic view illustrating a configuration of the robot 1 in accordance with the present embodiment.

The robot 1 is a robot that is capable of being subjected to direct teaching of any motion. According to the present embodiment, a motion directly taught to the robot 1 is assumed to be a press-fitting motion for press-fitting a second member W2 (e.g., metal pin) into an opening or a recess of a first member W1 (e.g., metal collar). However, the motion directly taught to the robot 1 is not particularly limited thereto, and may be any motion.

As illustrated in FIG. 1, the robot 1 includes a robot hand 11, a robot arm 12, a force sensor 13, and a manipulating device 14, and a control device 15.

The robot hand 11 is a mechanism for grasping a workpiece (the second member W2, in the present embodiment). According to the present embodiment, a gripper is used as the robot hand 11. The robot arm 12 is a mechanism for moving the robot hand 11. According to the present embodiment, a vertical articulated arm is used as the robot arm 12.

The robot hand 11 is attached to the tip of the robot arm 12 via the force sensor 13. The force sensor 13 is a sensor configured to detect forces in three directions (x-, y-, and z-axis directions) acting on the robot hand 11, in particular, forces in the three directions applied by the user to move the robot hand 11 in the direct teaching. According to the present embodiment, a six-axis force sensor is used as the force sensor 13. However, any sensor that is capable of detecting forces in the three directions may be used as the force sensor 13.

Further, the manipulating device 14 is attached to or near the tip of the robot arm 12. The manipulating device 14 is a device that receives an operation that specifies a velocity in one direction (z-axis direction) of the robot hand 11, that is, a velocity in one direction along which the user intends to move the robot hand 11 in the direct teaching. According to the present embodiment, a joystick is used as the manipulating device 14. However, any device that is capable of receiving an operation specifying a velocity in one direction may be used as the manipulating device 14.

The control device 15 determines a position of the robot hand 11 in accordance with the forces detected by the force sensor 13 and a manipulated variable inputted into the manipulating device 14 (the inclination of the joystick, in the present embodiment), and the control device 15 provides, to the robot arm 12, an instruction to move the robot hand 11 to the determined position. Then, the control device 15 records the instruction provided to the robot arm as teaching data. By doing this, teaching is performed. According to the present embodiment, a personal computer (PC) is used as the control device 15. However, any device that is capable of providing below-mentioned function of the control device 15 may be used as the control device 15.

The control device 15 operates in either a first operation mode or a second operation mode. Here, the first operation mode is an operation mode in which admittance control (force input and motion output-type control) is performed to determine positions x, y, and z in the three directions of the robot hand 11 in accordance with forces $F_x$, $F_y$, and $F_z$ in the three directions detected by the force sensor 13. The second operation mode is a mode in which (i) admittance control is performed to determine positions x and y in two directions of the robot hand 11 in accordance with forces $F_x$ and $F_y$ in the two directions detected by the force sensor 13, and (ii) velocity control is performed to determine position z in one direction of the robot hand 11 in accordance with manipulated variable θ inputted into the manipulating device 14. The following will describe a function of the control device 15.

Figure 2:
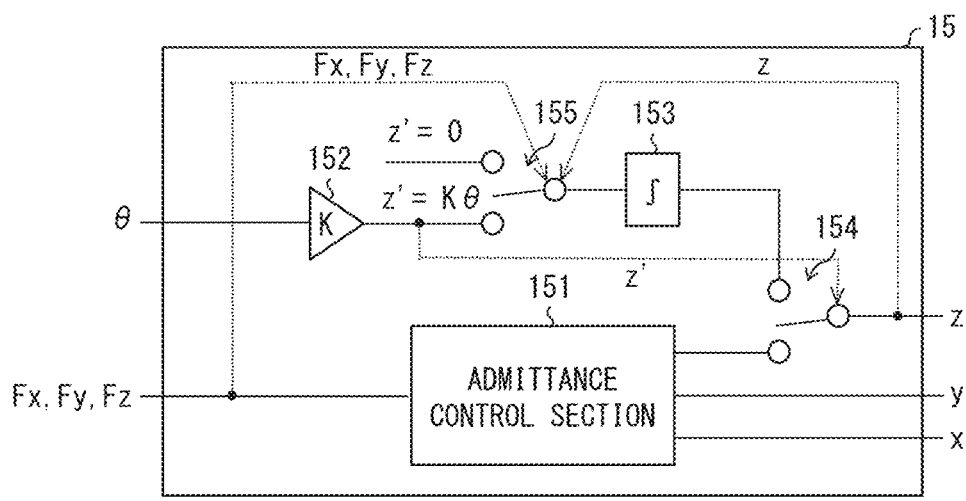
FIG. 2 is a block diagram illustrating a function of a control device included in the robot illustrated in FIG. 1.

The function of the control device 15 included in the robot 1 will be described with reference to FIG. 2. FIG. 2 is a functional block diagram illustrating the function of the control device 15.

The control device 15 includes an admittance control section 151, a multiplying section 152, an integrating section 153, and a mode switch 154. To the control device 15, inputted are forces $F_x$, $F_y$, and $F_z$ in the three directions detected by the force sensor 13 and manipulated variable θ inputted into the manipulating device 14 (e.g., the inclination of the joystick). Each of forces $F_x$, $F_y$, and $F_z$ may be raw data of forces as detected by the force sensor 13, or alternatively, may be data obtained by shaping, in the dead zone, forces detected by the force sensor 13.

The admittance control section 151 performs, in the first operation mode, admittance control to determine positions x, y, and z in the three directions of the robot hand 11 in accordance with forces $F_x$, $F_y$, and $F_z$ in the three directions detected by the force sensor 13. Specifically, the admittance control section 151 determines positions x, y, and z in the three directions of the robot hand 11 by solving (integrating) the following equation of motion (1).

$$x'' = -\frac{c_x}{m_x}x' + \frac{a_x}{m_x}F_x \qquad (1)$$

$$y'' = -\frac{c_y}{m_y}x' + \frac{a_y}{m_y}F_y$$

$$z'' = -\frac{c_z}{m_z}x' + \frac{a_z}{m_z}F_z$$

Herein, x' is first-order derivative dx/dt (velocity) of position x, and x" is second-order derivative $d^2x/dt^2$ (acceleration) of position x. Further, y' is first-order derivative dy/dt (velocity) of position y, and y" is second-order derivative $d^2x/dt^2$ (acceleration) of position y. Further, z' is first-order derivative dz/dt (velocity) of position z, and z" is second-order derivative $d^2x/dt^2$ (acceleration) of position z. Each of $m_x$, $m_y$, and $m_x$ is a constant representing a virtual mass (e.g., 10 kg). Each of $c_x$, $c_y$, and $c_x$ is a constant representing a virtual coefficient of viscosity (e.g., 100 kg/s). Each of $\alpha_x$, $\alpha_y$, and $\alpha_z$ is a constant indicating force sensitivity (e.g., 1). Position x may be calculated by solving an equation of motion other than that mentioned above, and such an equation may be, for example, $x'=\alpha_x F_x$. The same applies to position y and position z.

Further, the admittance control section 151 performs, in the second operation mode, admittance control to determine positions x and y in two directions of the robot hand 11 in accordance with the forces $F_x$ and $F_y$ in the two directions detected by the force sensor 13. Specifically, the admittance control section 151 determines positions x and y in the two directions of the robot hand 11 by solving (integrating) the following equation of motion (2a).

$$x'' = -\frac{c_x}{m_x}x' + \frac{a_x}{m_x}F_x \qquad (2a)$$

$$y'' = -\frac{c_y}{m_y}x' + \frac{a_y}{m_y}F_y$$

Herein, x' is first-order derivative dx/dt (velocity) of position x, and x" is second-order derivative $d^2x/dt^2$ (acceleration) of position x. Further, y' is first-order derivative dy/dt (velocity) of position y, and y" is second-order derivative $d^2y/dt^2$ (acceleration) of position y. Further, z' is first-order derivative dz/dt (velocity) of position z. Each of $m_x$ and $m_y$ is a constant representing a virtual mass (e.g., 10 kg). Each of $c_x$ and $c_y$ is a constant representing a virtual coefficient of viscosity (e.g., 200 kg/s). Each of $\alpha_x$ and $\alpha_y$ is a constant indicating force sensitivity (e.g., 1). Position x may be calculated by solving an equation of motion other than that mentioned above, and such an equation may be, for example, $x'=\alpha_x F_x$. The same applies to position y.

The multiplying section 152 and the integrating section 153 perform, in the second operation mode, velocity control to determine position z in the remaining one direction of the robot hand 11 in accordance with manipulated variable θ inputted into the manipulating device 14. Specifically, the multiplying section 152 and the integrating section 153 determine position z in the remaining one direction of the robot hand 11 by solving (integrating) the following equation of motion (2b).

$$z'=K\theta \qquad (2b)$$

Herein, K is a conversion factor for converting manipulated variable θ into velocity z' (e.g., 0.0005). Position z may be calculated by solving an equation of motion other than that mentioned above, and such an equation may be, for example, $z''=-(c/m_z)z'+(\alpha_z/m_z)\theta$.

The mode switch 154 is a switch configured to switch the operation modes in accordance with manipulated variable θ inputted into the manipulating device 14. Specifically, when θ=0, that is, z'=0, the mode switch 154 switches the operation mode to the first operation mode, whereas, when θ≠0, that is, z'≠0, the mode switch 154 switches the operation mode to the second operation mode.

With the foregoing configuration, it is possible to determine, in the first operation mode, by performing admittance control, positions x, y, and z in the three directions of the robot hand 11 in accordance with forces $F_x$, $F_y$, and $F_z$ in the three directions detected by the force sensor 13. That is, in the first operation mode, it is possible to offer power assistance to a user in moving the robot hand 11 by the control of the robot arm 12 performed by the control device 15. This enables the user to perform direct teaching more precisely with a smaller force.

However, there may be a case in which a reaction force in the z-axis direction is exerted by the workpiece on the robot hand 11, in addition to a user's force applied to move the robot hand 11. For example, during press-fitting operation, a reaction force in the z-axis direction is exerted by the second member W2 on the robot hand 11, in addition to a user's force applied to move the robot hand 11. In this case, it is difficult, in the first operation mode in which the admittance control is performed in the three directions, to move the robot hand 11 to a position desired by the user.

In contrast, with the above configuration, it is possible, in the second operation mode, to (i) determine, by performing admittance control, positions x and y in two directions of the robot hand 11 in accordance with forces $F_x$ and $F_y$ in the two directions detected by the force sensor 13, and (ii) determine, by performing velocity control, position z in one direction of the robot hand 11 in accordance with manipulated variable θ inputted into the manipulating device 14. Thus, even in a case in which a reaction force in the z-axis direction is exerted by the workpiece on the robot hand 11, it is possible to easily move the robot hand 11 to a position desired by the user by switching the operation modes from the first operation mode to the second operation mode.

It should be noted that the switching from the first operation mode to the second operation mode occurs in response to a situation in which manipulated variable θ of the manipulating device 14 changes from 0. For example, in a case in which a joystick is used as the manipulating device 14, the switching from the first operation mode to the second operation mode occurs when the user touches the joystick and the joystick starts inclining. Thus, it is possible to cause transition to a control that uses the manipulating device 14 by a natural action, without making the user aware of the switching of the operation modes.

In addition, the control device 15 includes a safety switch 155. The safety switch 155 is a switch configured to set velocity z' of the robot hand 11 to zero (to stop the motion in the z-axis direction) in the second operation mode, in accordance with forces $F_x$, $F_y$, and $F_z$ detected by the force sensor 13 and position z of the robot hand 11. Specifically, assuming that z0 is a predetermined constant, when (i) z>z0 and (ii) $F_x$≠0, $F_y$≠0, or $F_z$≠0, velocity z' of the robot hand is set to zero. Herein, for example, z0 is a position of the robot hand 11 at the time when the height of the lower face of the second member W2 and the height of the upper face of the first member W1 are the same.

With the foregoing configuration, when a force acts on the robot hand 11 in a case of z>z0, velocity z' in the z-axis direction of the robot hand 11 becomes zero regardless of manipulated variable θ of the manipulating device 14. Thus, for example, in a case in which a user's hand is caught between the first member W1 and the second member W2, it is possible to reduce the probability that the user is injured. It should be noted that, in a case of z≤z0, even when a force acts on the robot hand 11, velocity z' in the z-axis direction of the robot hand 11 is Kθ. Thus, even when a reaction force in the z-axis direction is exerted by the second member W2 on the robot hand 11, it is possible to complete the press-fitting operation of the second member W2.

It is preferable that the admittance control section 151 has, in the second operation mode, a function of reducing force sensitivities $\alpha_x$ and $\alpha_y$ in accordance with the numbers of change $n_x$ and $n_y$ of sign of forces $F_x$ and $F_y$ acting on the robot hand 11. Specifically, it is preferable to have a function of reducing force sensitivities $\alpha_x$ and $\alpha_y$ in accordance with the following formulas (3). In the following formulas (3), r is a constant that is greater than 1, which represents the reduction ratio.

$$a_x = \frac{1}{r^{n_x}}$$
$$a_y = \frac{1}{r^{n_y}}$$
(3)

When the fitting of the first member W1 and the second member W2 is performed, chattering may occur during the press-fitting operation. As used herein, "chattering" refers to movement that repeats the following motions: (1) a side face of the second member W2 comes into contact with an inner wall of the opening of the first member W1 on a side of the positive direction of x-axis, so that force $F_x$ in the negative direction of x-axis acts on the side face, (2) the second member W2 moves in the negative direction of x-axis, (3) the side face of the second member W2 comes into contact with an inner wall of the opening of the first member W1 in the negative direction of x-axis, so that force $F_x$ in the positive direction of x-axis acts on the side face, and (4) the second member W2 moves in the positive direction of x-axis. In contrast, with the above configuration, it is possible to reduce force sensitivity $\alpha_x$ each time the sign of force $F_x$ changes, so that it is possible to suppress the occurrence of chattering.

Figure 3:
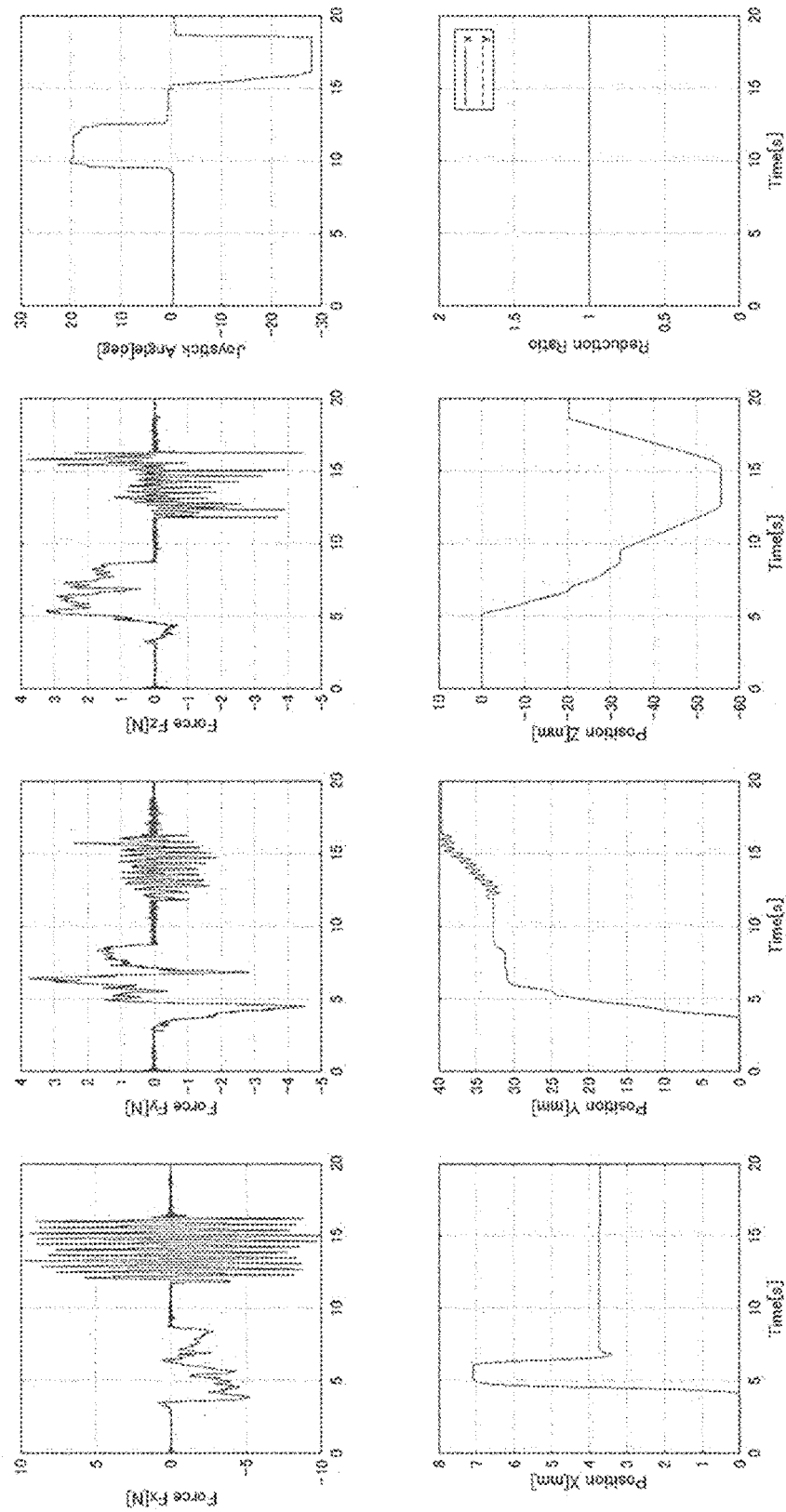
FIG. 3 is graphs illustrating temporal changes in force detected by a force sensor, manipulated variable inputted into a manipulating device, position of a robot hand, and force sensitivity, in a case in which an admittance control section has no force sensitivity reduction function.

FIG. 3 is graphs illustrating temporal changes in force $F_x$, $F_y$, and $F_z$ detected by the force sensor 13, manipulated variable θ inputted into the manipulating device 14, positions x, y, and z of the robot hand 11, and force sensitivities $\alpha_x$ and $\alpha_y$, in a case in which the admittance control section 151 has no force sensitivity reduction function. The graphs show that forces $F_x$, $F_y$, and $F_z$ and position y wiggle, that is, chatter, because force sensitivities $\alpha_x$ and $\alpha_y$ are constant.

Figure 4:
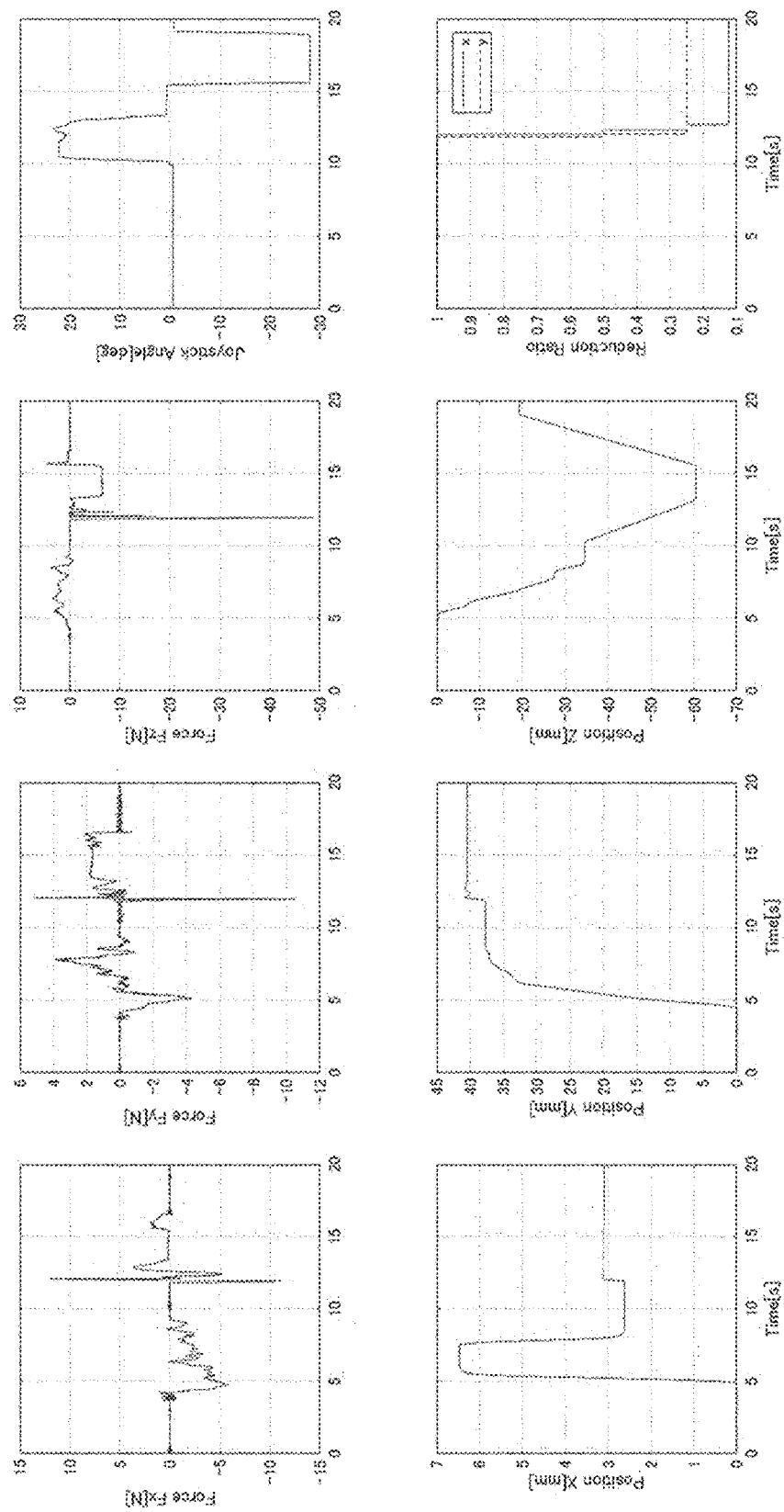
FIG. 4 is graphs illustrating temporal changes in force detected by a force sensor, manipulated variable inputted into a manipulating device, position of a robot hand, and force sensitivity, in a case in which an admittance control section has a force sensitivity reduction function.

FIG. 4 is graphs illustrating temporal changes in force $F_x$, $F_y$, and $F_z$ detected by the force sensor 13, manipulated variable θ inputted into the manipulating device 14, positions x, y, and z of the robot hand 11, and force sensitivities $\alpha_x$ and $\alpha_y$, in a case in which the admittance control section 151 has the force sensitivity reduction function. The graphs reveal that, because force sensitivities $\alpha_x$ and $\alpha_y$ is reduced suddenly, chattering, which occurs when the control device 15 has no force sensitivity reduction function, is suppressed.

The present invention is not limited to the foregoing embodiments, but can be altered by a skilled person in the art within the scope of the claims. The present invention also encompasses, in its technical scope, any embodiment derived by combining technical means disclosed in the foregoing embodiments.

REFERENCE SIGNS LIST

1 Robot
11 Robot hand
12 Robot arm
13 Force sensor
14 Manipulating device
15 Control device

The invention claimed is:

1. A robot comprising:
   a robot arm;
   a robot hand attached to the robot hand;
   a force sensor configured to detect a force acting on the robot hand;
   a control device that performs admittance control to determine a position of the robot hand in accordance with the force detected by the force sensor, provides, to the robot arm, an instruction to move the robot hand to the determined position, and records, as teaching data, the instruction provided to the robot arm; and
   a manipulating device,
   wherein the control device operating in a first operation mode performs admittance control to determine positions in three directions of the robot hand in accordance with forces in the three directions detected by the force sensor, and
   wherein the control device operating in a second operation mode performs admittance control to determine positions in two directions of the robot hand in accordance with forces in the two directions detected by the force sensor, and performs velocity control to determine a position in the remaining one direction of the robot hand in accordance with a manipulated variable inputted into the manipulating device.

2. The robot according to claim 1, wherein the control device operating in the first operation mode determines positions x, y, and z of the robot hand by solving an equation of motion including forces Fx, Fy, and Fz detected by the force sensor and force sensitivities ax, ay, and az.

3. The robot according to claim 1, wherein the equation of motion is the following formulas (1):
   wherein each of mx, my, and mz is a constant representing a virtual mass, and each of cx, cy, and cz is a constant representing a virtual coefficient of viscosity.

4. The robot according to claim 1, wherein the control device operating in the second operation mode determines positions x and y of the robot hand by solving a first equation of motion including forces Fx and Fy detected by the force sensor and force sensitivities ax, ay, and az, and determines position z of the robot hand by solving a second equation of motion including manipulated variable θ inputted into the manipulating device.

5. The robot according to claim 4, wherein the first equation of motion is the following formulas (2a), and the second equation of motion is the following formula (2b):
   wherein, each of mx, my, and mz is a constant representing a virtual mass, each of cx, cy, and cz is a constant representing a virtual coefficient of viscosity, and K is a conversion factor for converting manipulated variable θ into velocity z'.

6. The robot according to claim 4, wherein the control device operating in the second operation mode reduces force sensitivities ax and ay in accordance with numbers of change of sign of forces detected by the force sensor.

7. The robot according to claim 1, wherein the control device operating in the second operation mode determines the position in the one direction of the robot hand in accordance with the forces detected by the force sensor and the positions of the robot hand so that a velocity in the one direction of the robot hand becomes zero.

8. The robot according to claim 1, wherein the manipulating device is a joystick attached to the robot arm, and the manipulated variable is an inclination of the joystick.

9. The robot according to claim 1, wherein a motion to be taught is a press-fitting motion for press-fitting a second member into an opening or a recess of a first member.

10. A method of controlling a robot comprising a robot arm, a robot hand attached to the robot arm, and a force sensor configured to detect a force acting on the robot hand, the method comprising a controlling step of:
    performing admittance control to determine a position of the robot hand in accordance with the force detected by the force sensor;
    providing, to the robot arm, an instruction to move the robot hand to the determined position; and
    recording, as teaching data, the instruction provided to the robot arm, the controlling step being performed by use of a control device,
    wherein the control device operating in a first operation performs admittance control to determine positions in three directions of the robot hand in accordance with forces in the three directions detected by the force sensor, and
    wherein the control device operating in a second operation mode performs admittance control to determine positions in two directions of the robot hand in accordance with forces in the two directions detected by the force sensor, and performs velocity control to determine a position in the remaining one direction of the robot hand in accordance with a manipulated variable inputted into a manipulating device.

* * * * *